United States Patent [19]
de Schepper et al.

[11] Patent Number: 5,767,420
[45] Date of Patent: Jun. 16, 1998

[54] TORQUE DETECTING DEVICE

[75] Inventors: Frank de Schepper, Tombeek-Overijse, Belgium; Kenji Suzuki, Okazaki; Takenori Kano, Toyota, both of Japan

[73] Assignee: Aisin AW Co., Ltd., Japan

[21] Appl. No.: 700,048

[22] Filed: Aug. 19, 1996

[30] Foreign Application Priority Data

Aug. 19, 1995  [JP]  Japan ................... 7-233497

[51] Int. Cl.$^6$ ..................................... G01L 3/02
[52] U.S. Cl. ........................ 73/862.329; 73/862.328
[58] Field of Search ............... 73/862.191, 862.326, 73/862.328, 862.329, 862.324, 862.325

[56] References Cited

U.S. PATENT DOCUMENTS

| | | | |
|---|---|---|---|
| 4,135,390 | 1/1979 | Templin | 73/862.326 |
| 4,488,443 | 12/1984 | Parkinson | 73/862.329 |
| 4,592,241 | 6/1986 | Obayashi et al. | 73/862.328 |
| 5,031,455 | 7/1991 | Cline | 73/862.328 X |
| 5,067,354 | 11/1991 | Kawai | 73/862.328 |
| 5,195,383 | 3/1993 | Tanaka et al. | 73/862.326 X |
| 5,341,675 | 8/1994 | Kampf et al. | 73/862.191 X |
| 5,400,663 | 3/1995 | Bridges | 73/862.326 |
| 5,450,761 | 9/1995 | Zilberman et al. | 73/862.324 X |
| 5,596,153 | 1/1997 | Bulgrien et al. | 73/862.326 |

*Primary Examiner*—Elizabeth L. Dougherty
*Attorney, Agent, or Firm*—Lorusso & Loud

[57] ABSTRACT

A torque detecting device includes a first rotary member connected to an input shaft and a second rotary member connected to an output shaft and arranged coaxially with the first rotary member. An elastic member is sandwiched between the first rotary member and the second rotary member and deforms according to the torque acting thereon. A sensor is arranged confronting the first and second rotary members to detect their rotational phases and a torque computer computes the torque by determining the rotational phase difference between the first and second rotary members from the rotational phases as detected by the sensor.

6 Claims, 17 Drawing Sheets

FIG. 11

| | C-0 | C-1 | C-2 | B-0 | B-1 | B-2 | B-3 | B-4 | F-1 | F-2 |
|---|---|---|---|---|---|---|---|---|---|---|
| P | ○ | | | | | | | | | |
| REV | ○ | | ○ | ○ | | | | ○ | | |
| N | ○ | | | | | | | | | |
| 1ST | ○ | ○ | | | | | | (○) | | ○ |
| 2ND | ○ | ○ | | | | | ○ | | | |
| 3RD | ○ | ○ | | | (○) | ○ | | | | |
| 4TH | ○ | ○ | ○ | | | △ | | | ○ | |
| 5TH | ○ | ○ | ○ | ○ | | △ | | | | |

( ) Applied at Engine Braking Time  △ Applied without Torque Transmission 5,767,420

1

TORQUE DETECTING DEVICE

BACKGROUND OF THE INVENTION

1. Field of the Invention

The present invention relates to a torque detecting device for computing torque by detecting the rotational phases of a first rotary member and a second rotary member, between which is sandwiched an elastic member which deforms according to the torque acting thereon, to determine the rotational phase difference between the two rotary members.

2. Related Art

In a torque detecting device, as disclosed in Japanese Patent Application Laid-Open No. 157541/1987 and shown in FIG. 17, the relative angle of rotation between two slit plates 1P and 2P, which are spaced on a shaft S and have a plurality of radial slits L, is detected by two sets of light emitting elements H and light receiving elements J which are arranged on opposite sides of the slit plates 1P and 2P. However, such a torque detecting device requires special parts and suffers from high cost and a complicated structure.

A magnetostrictive type torque detecting device is disclosed in Japanese Patent Application Laid-Open No. 157542/1987. In this prior art device, as shown in FIG. 18, torque is measured by detecting the magnetic strain which is established according to the torsion of a shaft S, by a detecting coil bobbin K which is interposed between two exciting coil bobbins R arranged spaced on the shaft S. However, this torque detecting device also requires special parts and suffers from high cost and a complicated structure.

SUMMARY OF THE INVENTION

Accordingly, it is an object of the present invention to provide a torque detecting device which has a simple structure and a low cost but can detect a low torque.

The present invention achieves the above-stated objective by providing a torque detecting device including a first rotary member connected to an input shaft, a second rotary member connected to an output shaft and arranged coaxially with the first rotary member and an elastic member sandwiched between the first rotary member and the second rotary member, which elastic member is deformed by the torque acting thereon. A sensor is arranged confronting the first and second rotary members for detecting the rotational phases of the two rotary members and torque computing means computes the torque by determining the rotational phase difference between the first and second rotary members from the rotational phases detected by the sensor.

The first and second rotary members have first and second sets of monitored elements which are circumferentially spaced (detected portions) and which are equal in number. The circumferential length of the monitored elements is equal to the circumferential length of the circumferential gaps between those monitored elements.

The torque computing means may compute the torque by detecting pulses corresponding to overlaps of first and second monitored elements, or to non-overlaps of the first and second detected elements.

2

Figure 3:
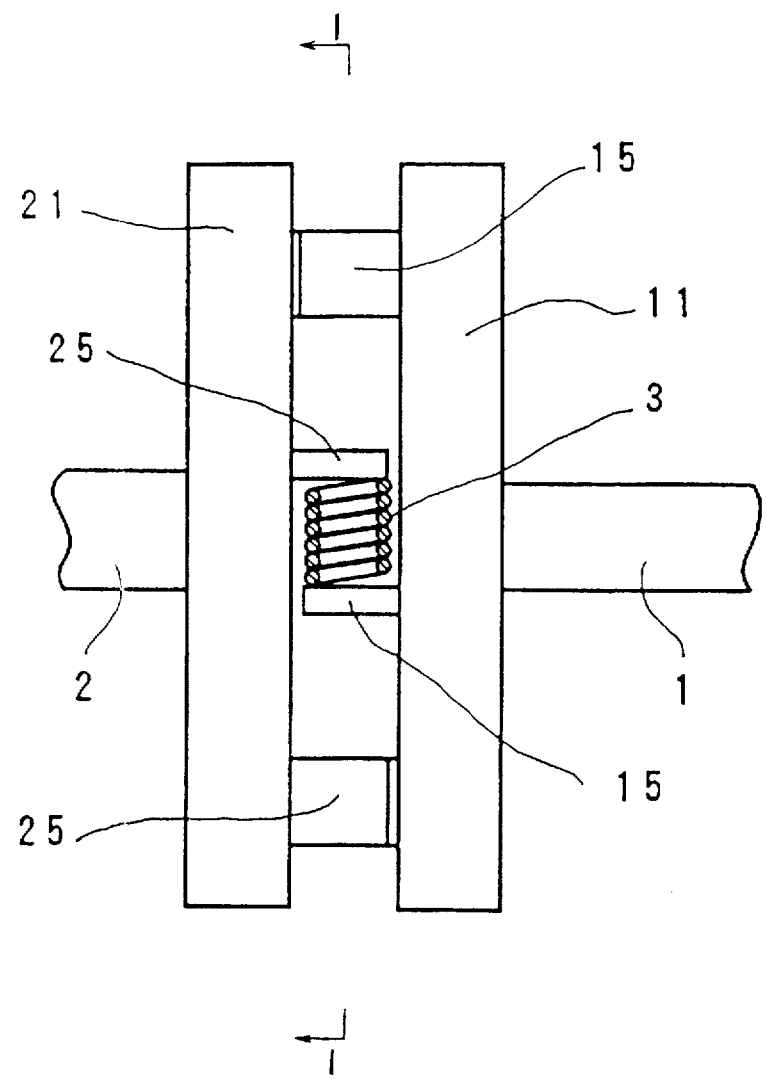
Figure 4:
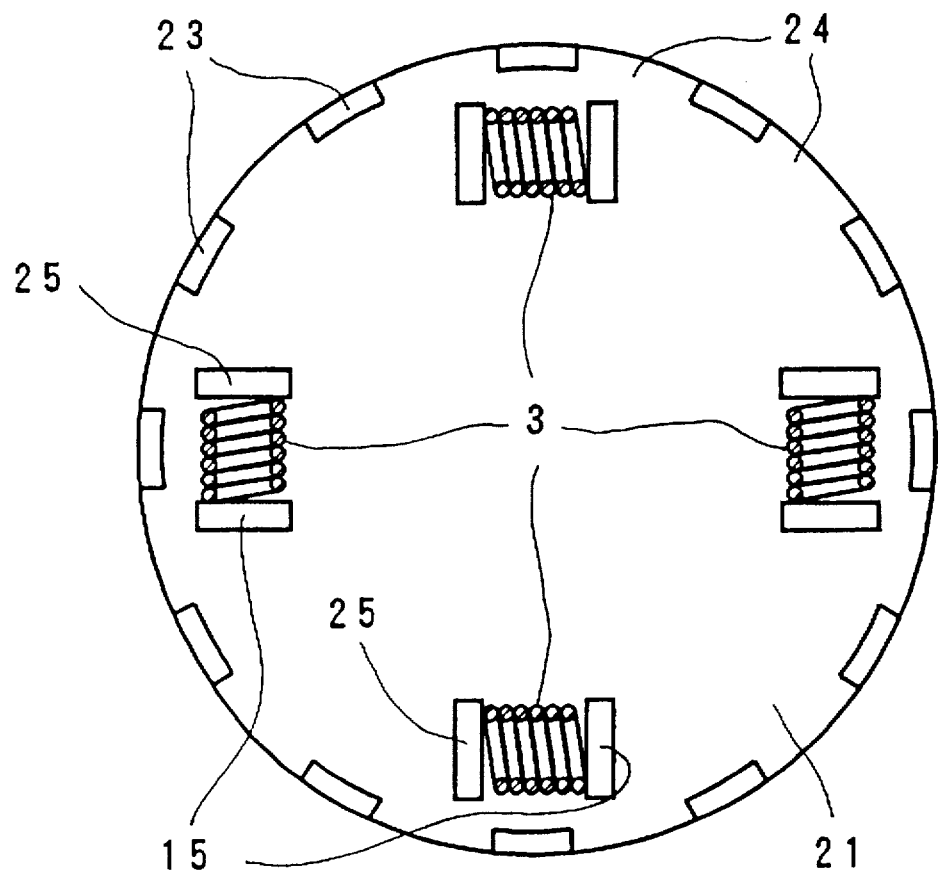
Figure 5:
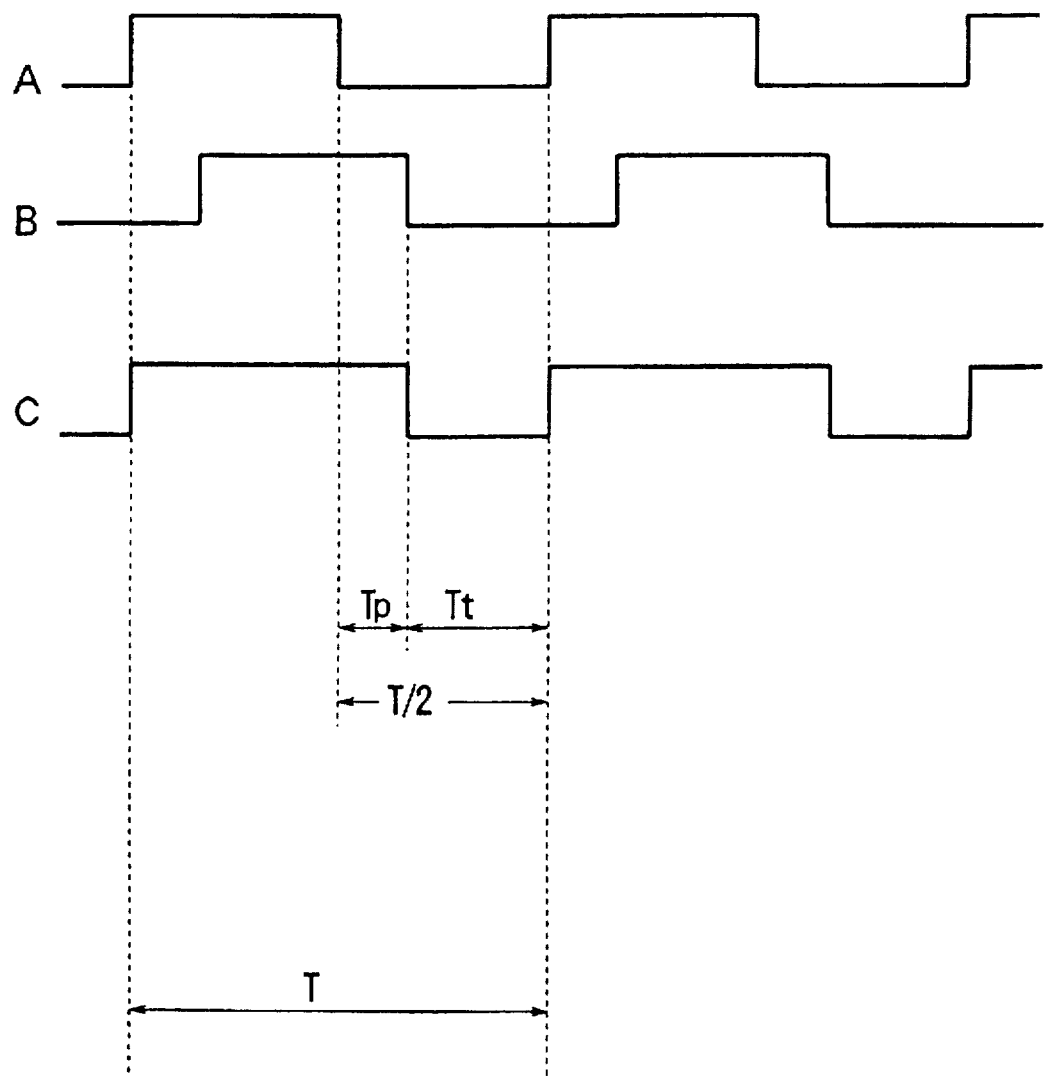
Figure 6:
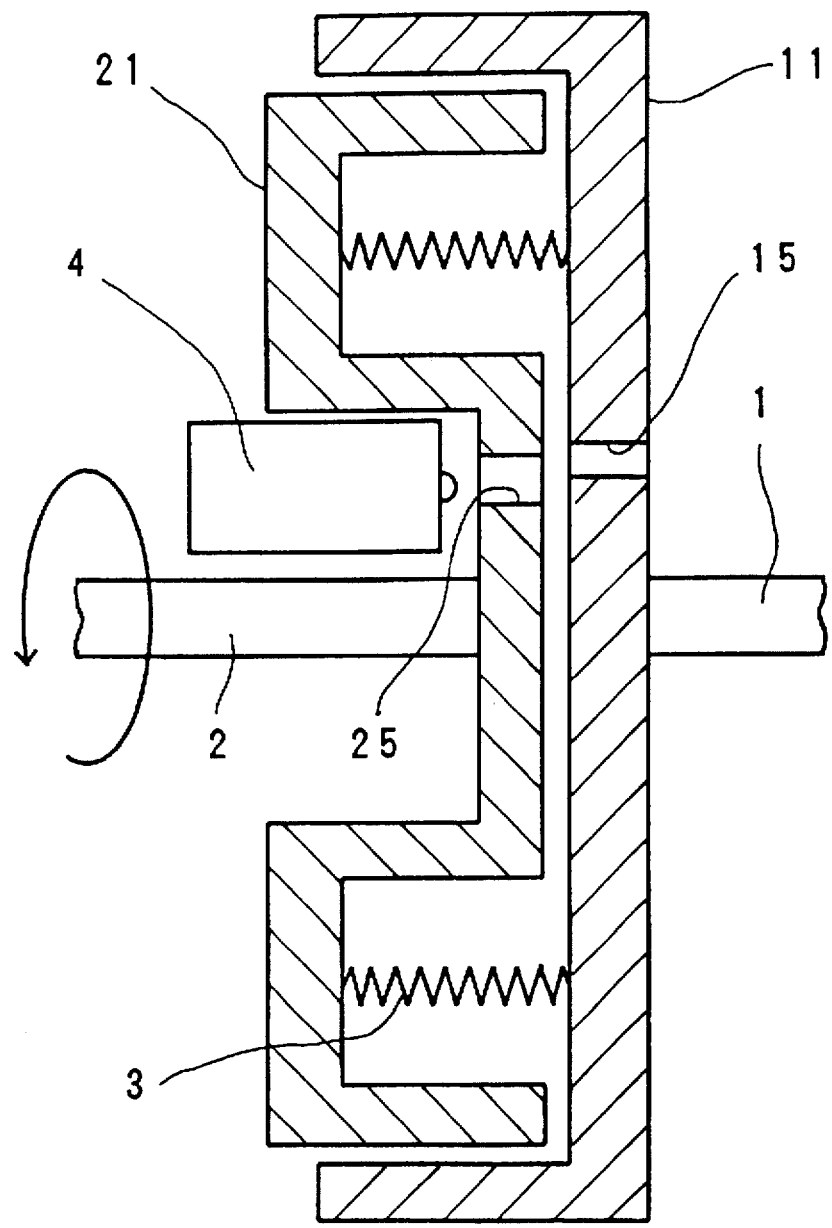
Figure 7:
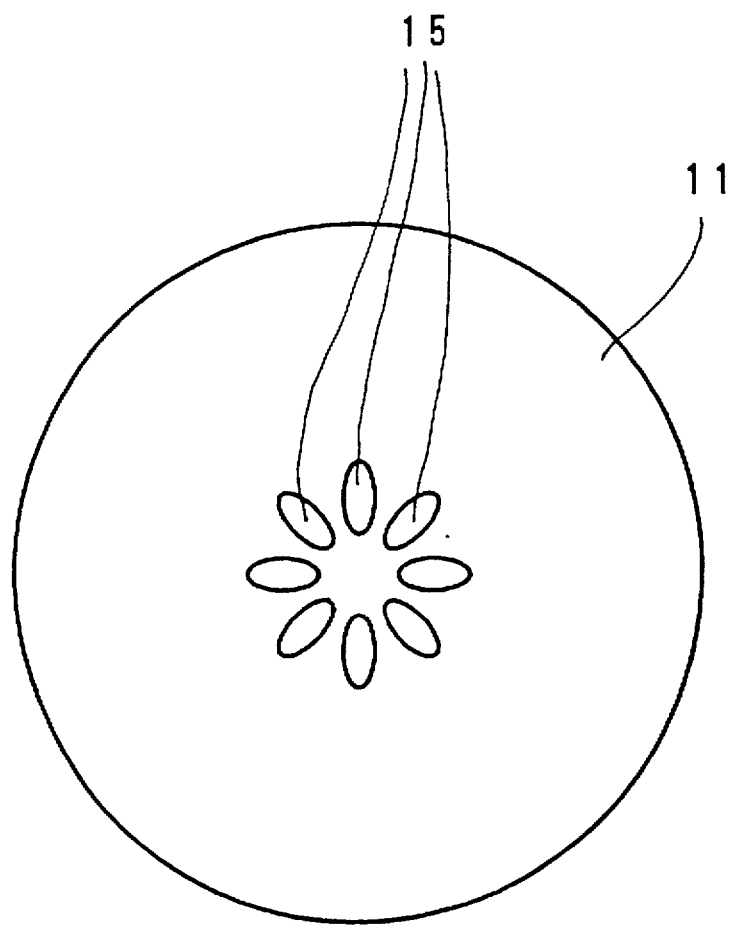
Figure 8:
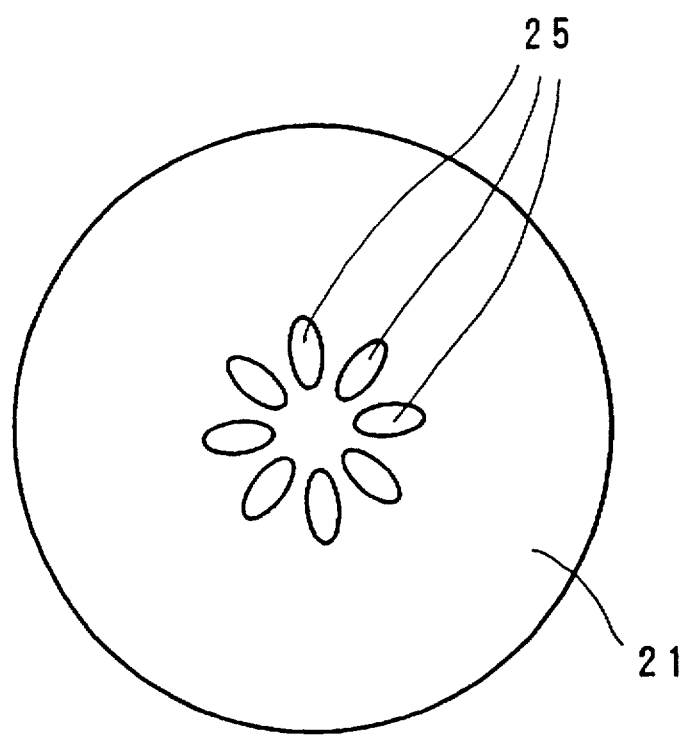
Figure 9:
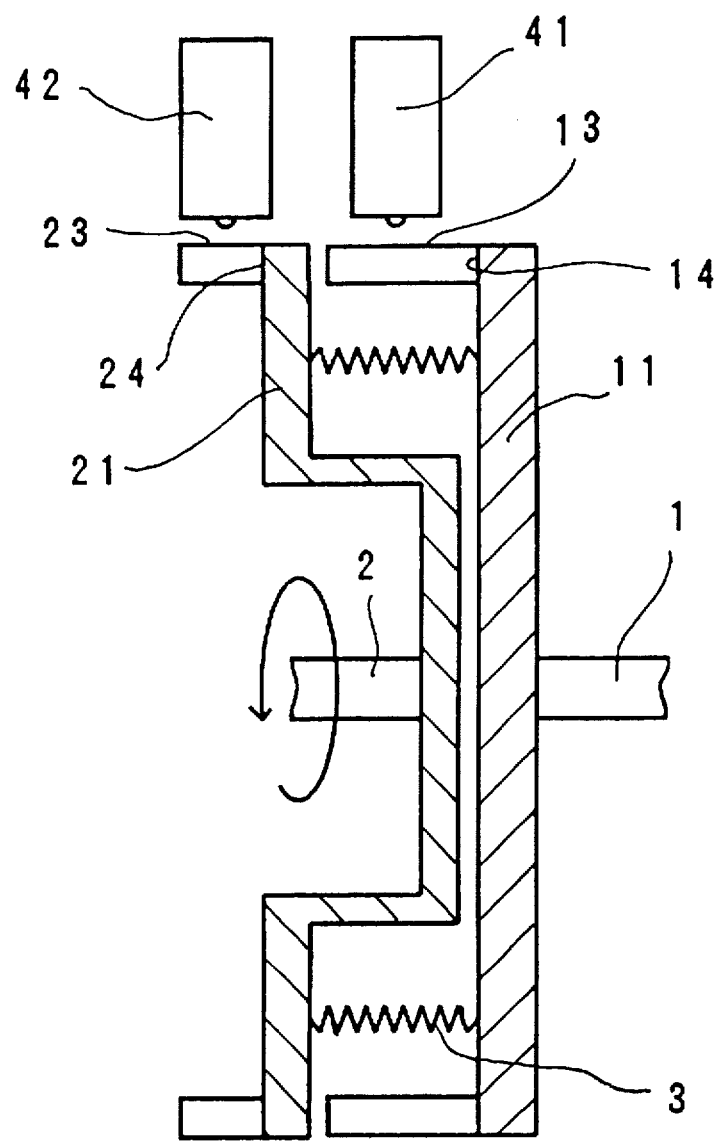
Figure 10:
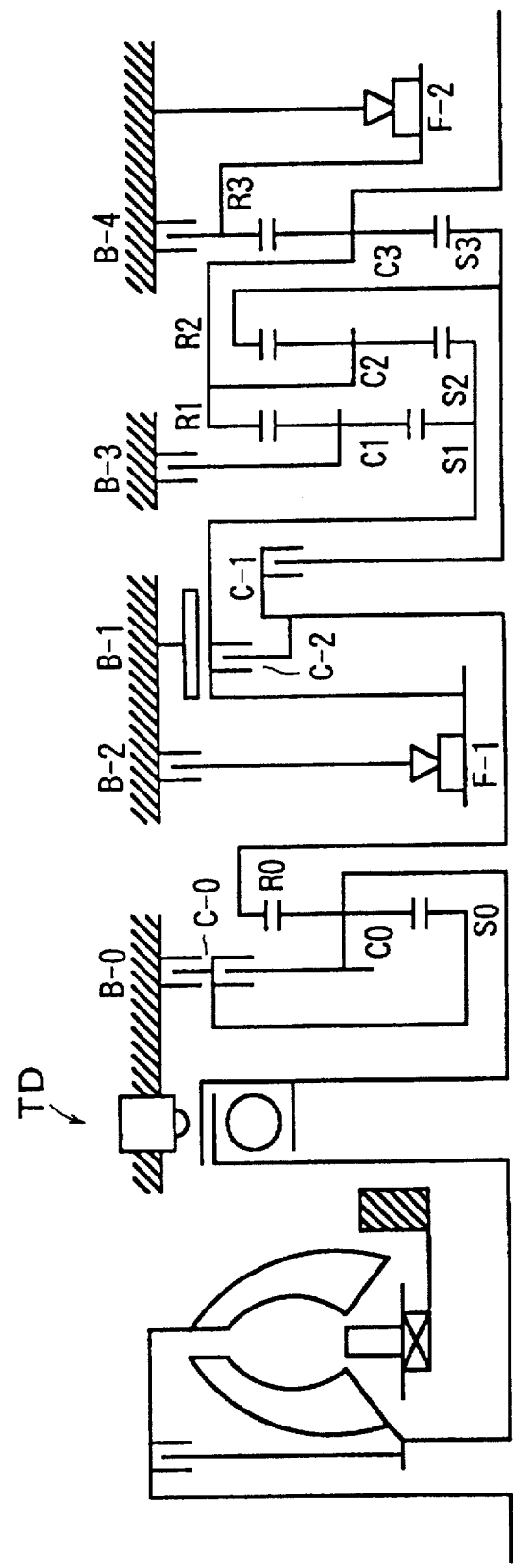
Figure 12:
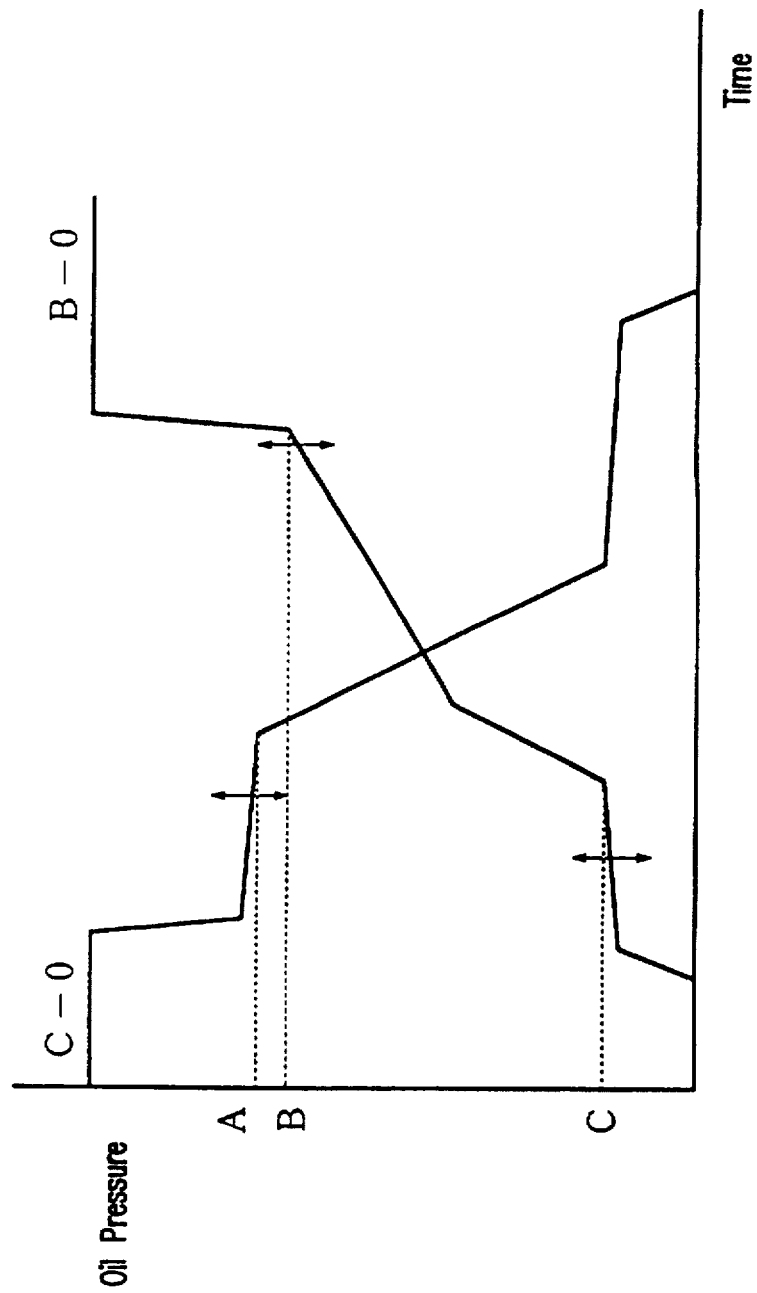
Figure 13:
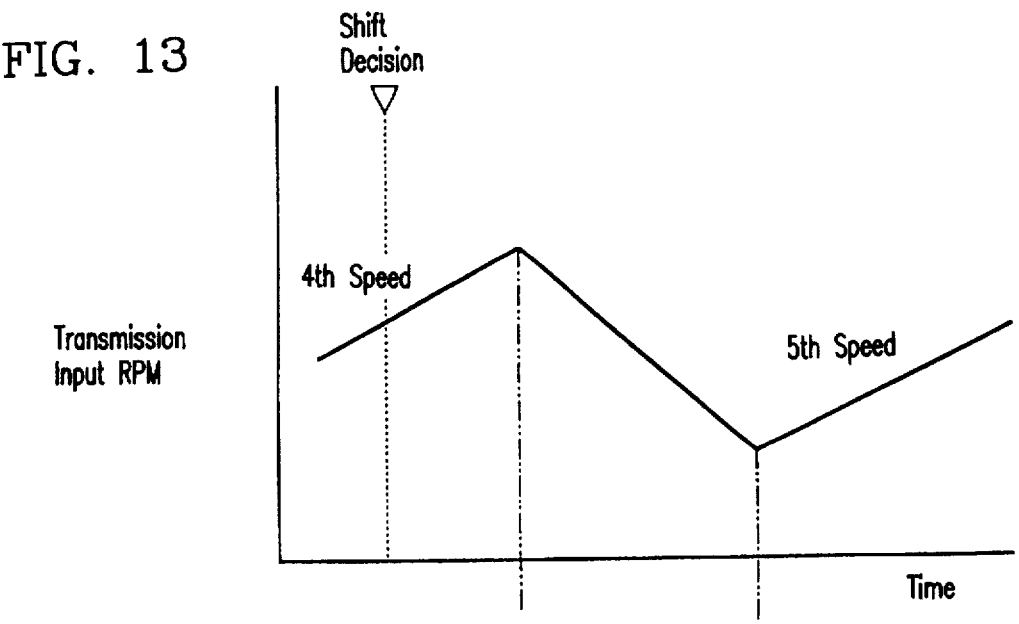
Figure 14:
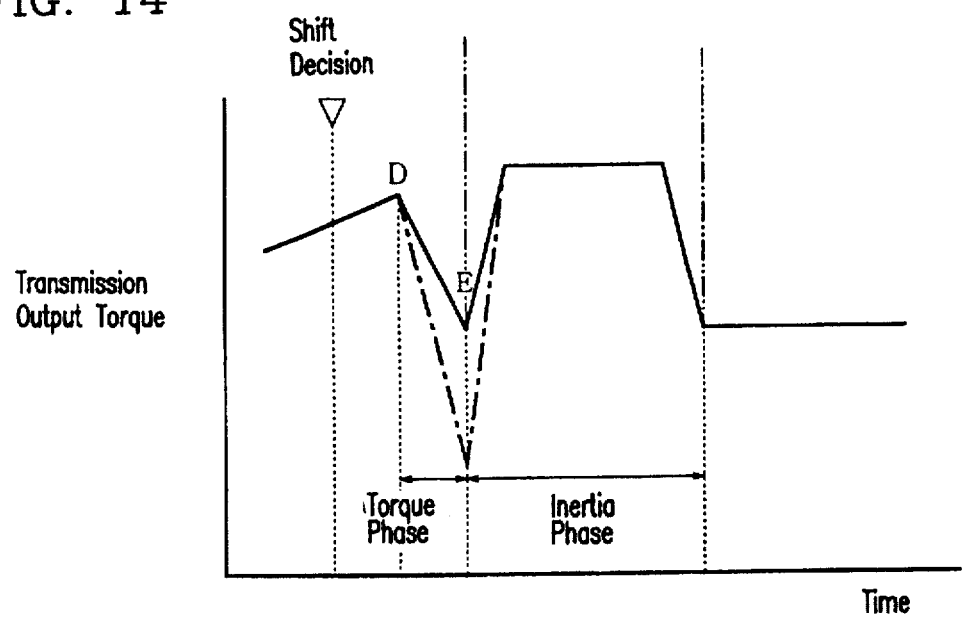
Figure 15:
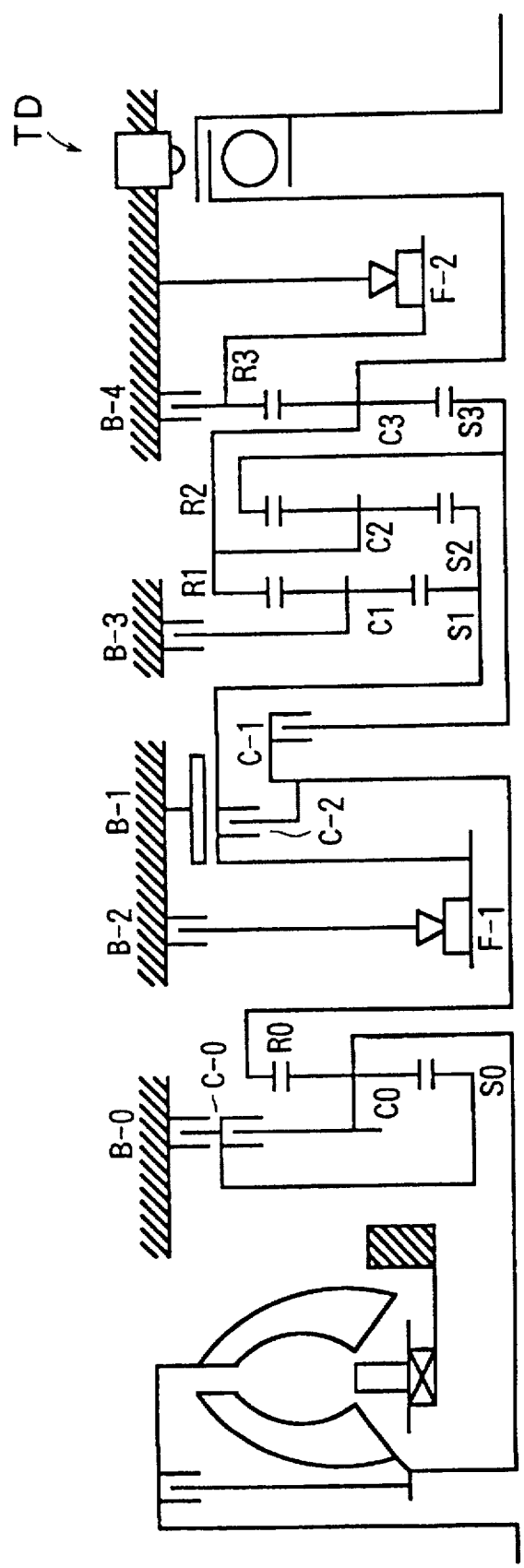
Figure 16:
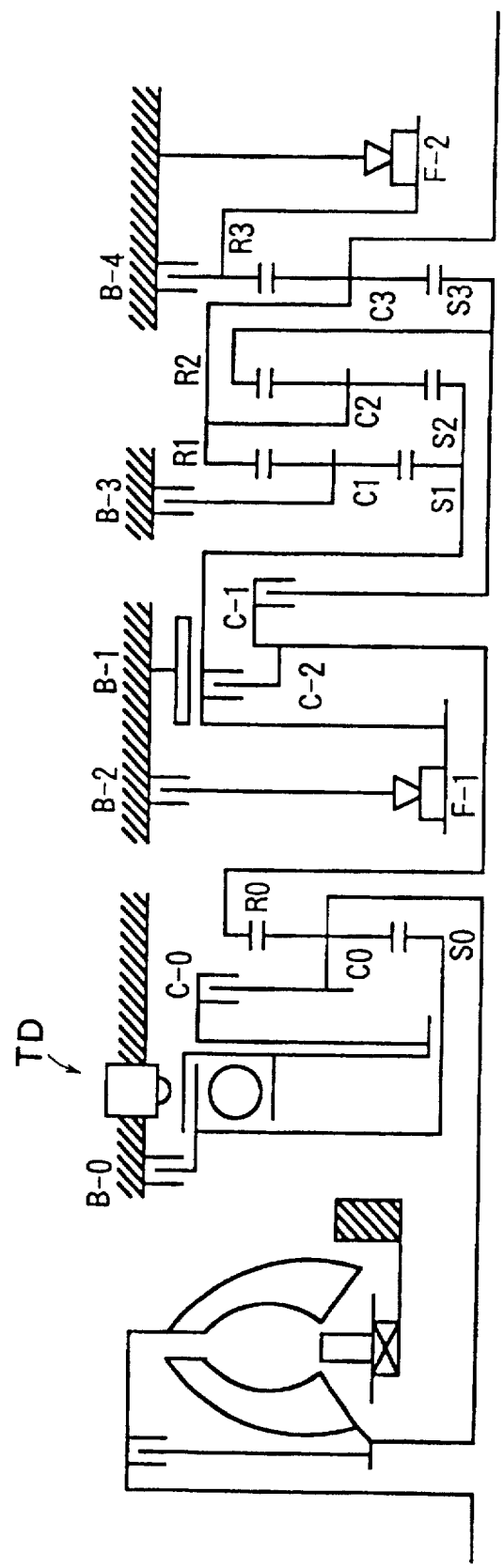
Figure 17:
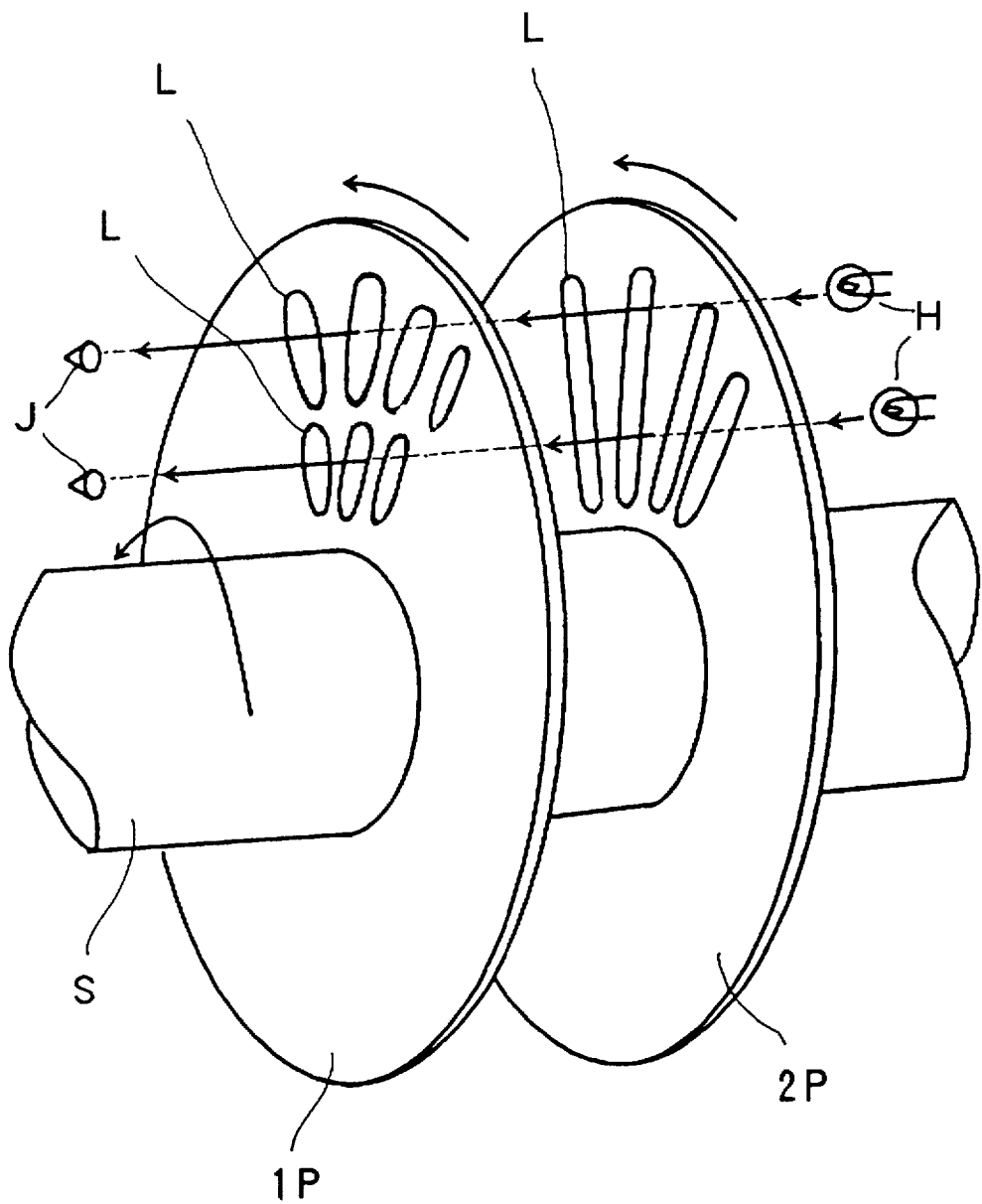
Figure 18:
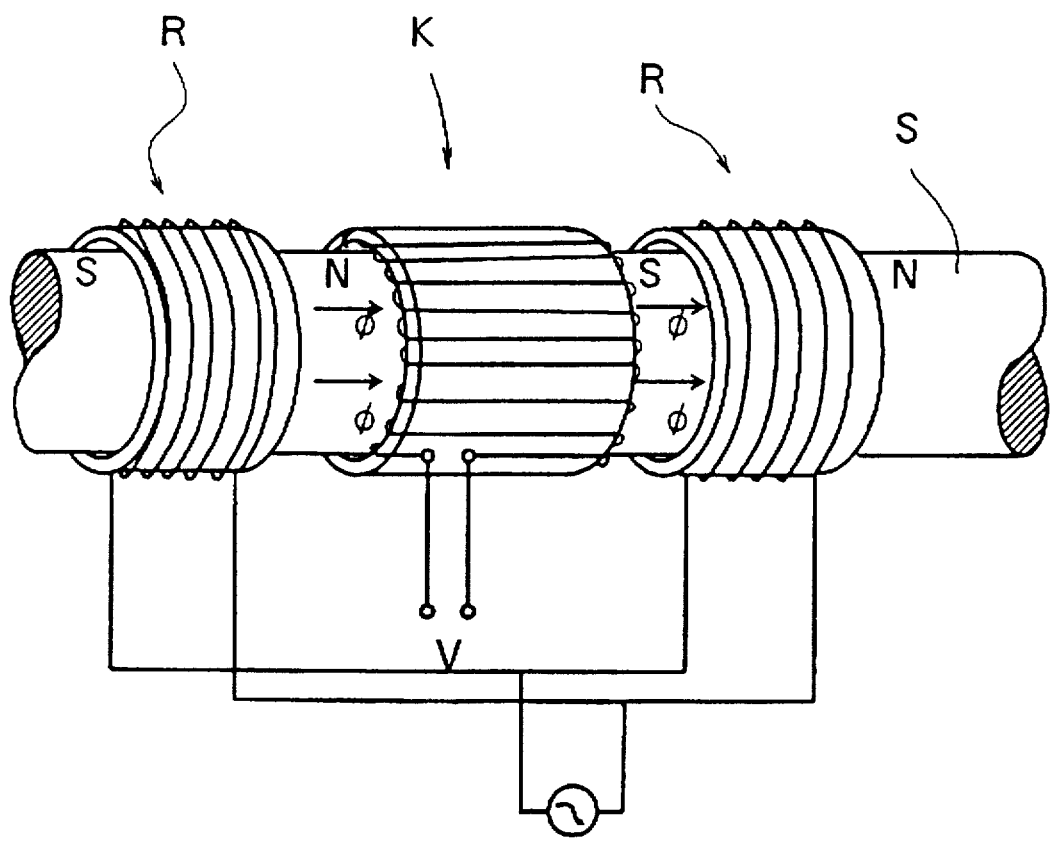

FIG. 3 is a side elevation showing the elastic member of the first embodiment;

FIG. 4 is a cross-sectional view taken along line 1—1 in FIG. 3;

FIG. 5 is a diagram showing patterns of the detection signals of a rotation sensor in the first embodiment;

FIG. 6 is a cross-sectional view of a torque detecting device according to a second embodiment of the present invention;

FIG. 7 is a side elevation of the first rotary member of the second embodiment;

FIG. 8 is a side elevation of the second rotary member of the second embodiment;

FIG. 9 is a cross-sectional view of showing a torque detecting device according to a third embodiment of the present invention;

FIG. 10 is a skeletal diagram of one example of an automatic transmission to which the present invention may be applied;

FIG. 11 is an operational table showing the operating states of the individual elements of the automatic transmission of FIG. 10 at various gear stages;

FIG. 12 is a graph of the oil pressure versus time in a clutch-to-clutch speed change shift in the transmission of FIG. 10;

FIG. 13 is a graph of the input RPM of the transmission versus time in the clutch-to-clutch speed change of FIG. 12;

FIG. 14 is a graph of the output torque of the transmission versus time in the clutch-to-clutch speed change of FIG. 12;

FIG. 15 is a skeletal diagram of a second example of an automatic transmission to which the present invention may be applied;

FIG. 16 is a skeletal diagram of a third example of an automatic transmission to which the present invention may be applied;

FIG. 17 is a perspective view of a torque detecting device of the prior art; and FIG. 18 is a perspective view of another torque detecting device of the prior art.

DESCRIPTION OF THE PREFERRED EMBODIMENTS

Several embodiments of the present invention will now be described with reference to the accompanying drawings.

The torque detecting device according to the first embodiment is designed for use in an automatic transmission for a vehicle. As shown in FIGS. 1 to 4, the torque detecting device includes a first rotary member 11 connected to an input shaft 1 and having first teeth (detected portions) 13, depending from the outer circumference thereof, and a second rotary member 21 connected to an output shaft 2, which is coaxial with the input shaft 1, and having second teeth (detected portions) 23, equal in number to first teeth 13 and depending from the outer circumference thereof. An elastic member 3 is sandwiched between the first rotary member 11 and the second rotary member 21 and deforms in accordance with the torque acting thereon. A rotation sensor 4 is arranged confronting (facing) the first and second teeth of the first and second rotary members for detecting the rotational phases of the two rotary members. Torque computing means 5 determines the rotational phase difference from the detected rotational phases of the first and second rotary members 11 and 12 to compute the torque acting thereon.

Figure 1:
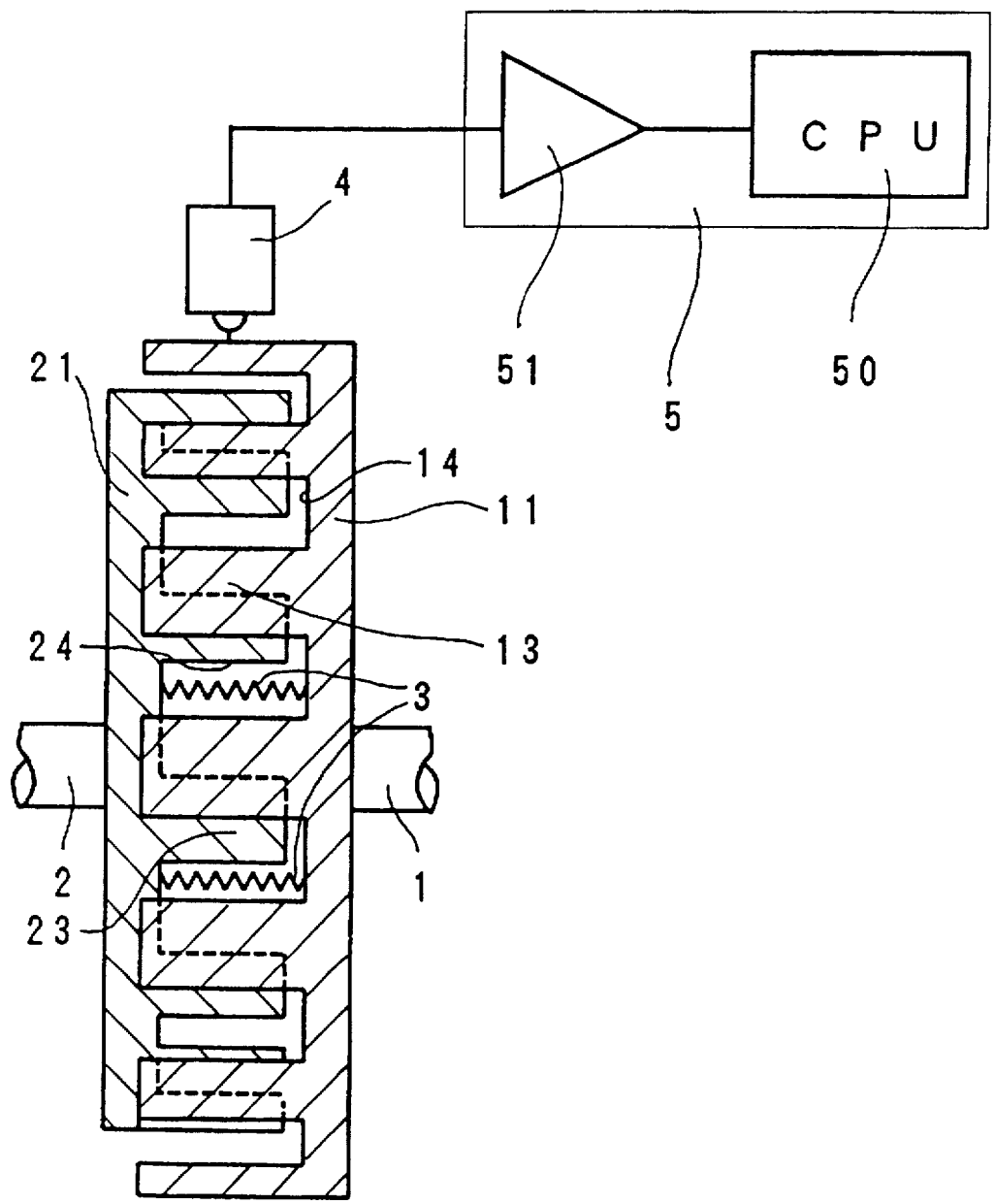
FIG. 1 is a block diagram showing a torque detecting device according to a first embodiment of the present invention.
Figure 2:
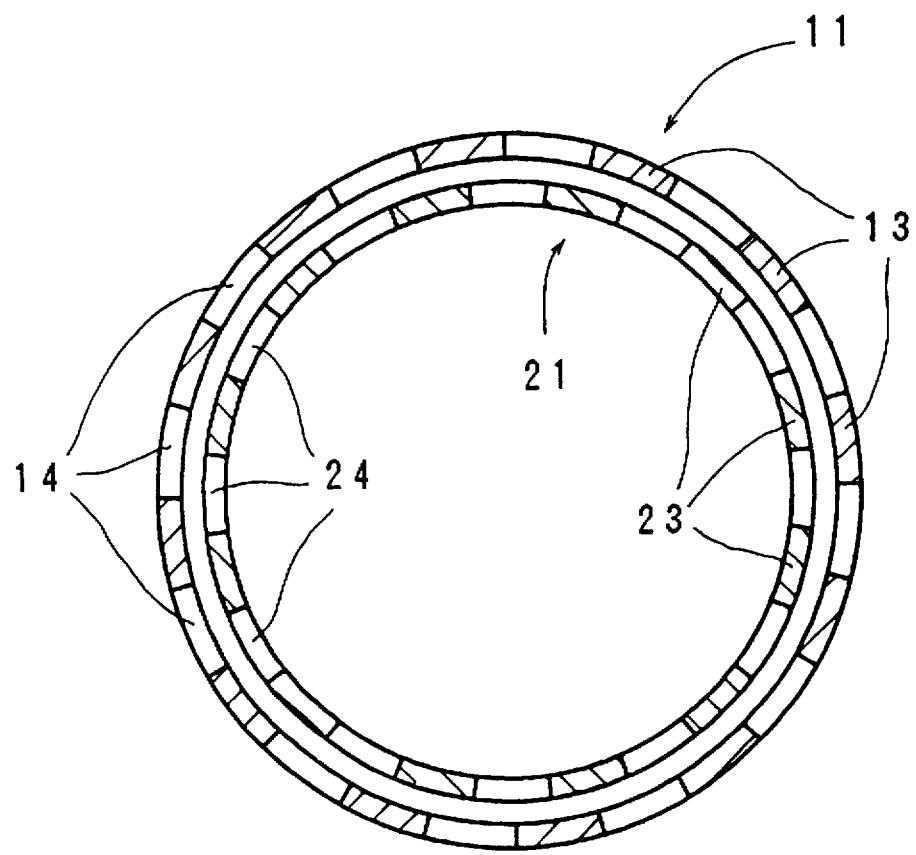
FIG. 2 is a cross-sectional view of first and second rotary members of the first embodiment.

The first and second rotary members 11 and 21 are bottomed hollow cylinders, as shown in FIGS. 1 and 2. Equal numbers of first and second teeth 13 and 23 are formed at equal intervals by forming notches 14 and 24 in the cylindrical walls of rotary members 11 and 21. The circumferential lengths of the comb teeth defining the cylindrical walls are equal to the circumferential lengths of the notches 14 and 24.

As seen in the embodiment of FIGS. 3 and 4, elastic member 3 is composed of four coil springs which are each held between a pair of projections 15 and 25. Pairs of projections 15 and 25 are arranged at intervals of 90 degrees adjacent the periphery of the bottoms of rotary members 11 and 21.

The rotation sensor 4 is composed of electromagnetic pickups and detects the first and second teeth 13 and 23 to determine the rotational phases (as indicated at A and B in FIG. 5) of the two and to generate a pulse signal (as indicated at C in FIG. 5). The low portions (valleys) of the pulse signals represent the common periods (overlap of areas) of the notches 14 and 24.

The torque computing means 5 is composed of an amplifier 51 connected to the rotation sensor 4 for amplifying the pulse signal and a CPU 50 for computing the torque. The torque computing means 5 computes the acting torque by computing proportion periods Tp (=T/2−Tt, wherein T is the period of revolution the input/output shaft, and Tt is the total of the common periods (periods of overlap) of the notches 14 and 24 formed between the first and second teeth 13 and 23) on the basis of the pulse signal (as indicated at C in FIG. 5) generated by the rotation sensor 4.

In the torque computation, the number of pulses detected per revolution of the first rotary member 11 or the second rotary member 21 (equal to the number of teeth formed in the first or second rotary member) is designated by P, and the time period (as shown in FIG. 5) per pulse is designated by T. Hence, the angular velocity V is determined by the following Formula 1:

$$V = 2\pi/P \cdot T$$

On the other hand, the time period of displacement between the first and second rotary members 11 and 21, which changes with the acting torque, is indicated by Tp (as shown in FIG. 5) so that the angle of displacement θ between the first and second rotary members 11 and 21 is determined by the following Formula 2:

$$\theta = V \cdot Tp$$

Here, the value Tp is determined from FIG. 5 by the following Formula 3:

$$Tp = T/2 - Tt$$

Torque M is determined by the following Formula 4, wherein the coil springs 3, sandwiched between the first and second rotary members 11 and 21, have a spring constant k:

$$M = k \cdot \theta$$

Hence, the torque M is determined from the following Formula 5 obtained by incorporating the foregoing Formulas 1–3 into Formula 4:

$$M = 2\pi \cdot k \cdot (\tfrac{1}{2} - Tt/T)/P$$

Thus, the torque detecting device of the first embodiment detects the rotational phase difference between the two rotary members and generates a pulse signal (as indicated at C in FIG. 5), wherein the low points in the signal correspond to common periods Tt of the notches 14 and 24 as shown in FIG. 5. In other words, the torque computing means 5 computes the torque by detecting the overlaps of the first and second teeth 13 and 23.

This first embodiment effectively detects a low torque, is simple in structure and is low in cost. For example, use of but a single rotation sensor represents a significant savings. Further, this first embodiment can employ an elastic member 3 having a low spring constant to enhance the torque detection accuracy. Thus, in the first embodiment, the torque is accurately detected by simple signal processing in the torque computing means 5.

Second Embodiment

The torque detecting device of the second embodiment is different from that of the first embodiment in that, instead of notches 14 and 24, the monitored elements (detected portions) are formed as pluralities of slits 15 and 25. These slits 15 and 25 extend radially from the central portions of the first and second rotary members 11 and 21, as shown in FIGS. 6 to 8. This embodiment also differs from the first embodiment in that the revolution sensor 4 is arranged to confront the slits 15 and 25.

In the torque detecting device of this second embodiment, the revolution sensor 4 generates a pulse signal (as indicated at C in FIG. 5) in which the low points represent overlap of the slits 15 and 25, as shown in FIG. 5. The torque computing means 5 computes the acting torque by computing the proportional periods (=T/2−Tt, wherein Tt is the period of rotation of the input/output shaft), i.e. proportional to the acting torque, on the basis of the pulse signal (as indicated at C in FIG. 5).

As in the case of the first embodiment, the torque detecting device of the second embodiment can be simply constructed at a low cost. Moreover, because the acting torque is computed by determining the rotational phase difference between the first and second rotary members 11 and 21, corresponding to the deformation of the elastic member 3 sandwiched between the first and second rotary members 11 and 21, a low torque can be detected, as in the first embodiment.

Third Embodiment

The torque detecting device of the third embodiment is different from that of the foregoing first embodiment in that the single revolution sensor of the first embodiment is replaced by two rotation sensors 41 and 42 which are arranged to confront the outer circumferences of the first and second rotary members 11 and 21, respectively, as shown in FIG. 9.

In the torque detecting device of the third embodiment, the rotation sensors 41 and 42 individually generate the two pulse signals shown as A and B in FIG. 5, wherein the low points correspond to the periods of overlap between the notches 14 and 24, formed between the first and second teeth 13 and 23. The torque computing means 5 computes the acting torque by computing the overlap periods Tp (=T/2−Tt, wherein T is the period of revolution of the input/output shaft proportional to the acting torque) of the two pulse signals.

In addition to the effects provided by the previously described embodiments, with the torque detecting device of the third embodiment, the torque computing means 5 can compute the overlap periods Tp directly as the time period between the fall of the more advanced pulse signal and the rise of the trailing pulse signal. As a result, the signals can be processed more easily than in the foregoing embodiments.

The foregoing embodiments have been chosen for purposes of illustration, as providing simplified signal processing Consistent with this purpose, the foregoing embodiments have been described as having cutouts or gaps alternating with elements of the same circumferential length. However, the present invention is not limited thereto but can be modified such that, for example, the embodiments with comb-shaped walls can have teeth and notches of arbitrary circumferential lengths.

While in the foregoing embodiments the rotation sensor outputs the signal peaks in response to confrontation by the wall elements and outputs the low portion of the signal in response to confrontation by the gaps between those wall elements, the present invention is not so limited and also contemplates another mode in which the revolution sensor outputs the low signal in response to confrontation by the wall elements and the high signal in response to confrontation by the gaps between the wall elements.

Further, while the foregoing embodiments monitor either comb-shaped cylindrical walls or radial slits, the present invention also contemplates use of other shapes and structures as the monitored elements on the first and second rotary members.

In the foregoing embodiments, the present invention has been described as applied to a one-way clutch. However, the present invention could also be applied to elements such as a lockup clutch, a multiple-disc clutch or a torque converter, as might be appropriate.

FIG. 10 shows an automatic transmission to which the present invention is applied. The automatic transmission depicted in FIG. 10 provides five speeds by combining an overdrive unit (or O/D unit), i.e. a pre-overdrive planetary gear unit, and a four forward and one reverse speed main transmission mechanism composed of three planetary gear sets. Also depicted in FIG. 10 is a torque converter TC having a lockup clutch L/C.

The O/D unit is composed of a multiple-disc clutch C-0 associated with a sun gear S0, a carrier C0, and a ring gear R0, and a multiple-disc brake B-0 arranged in series with the multiple-disc clutch C-0. The main transmission mechanism has three planetary gear sets, including individual speed change elements sun gears S1 to S3, carriers C1 to C3 and ring gears R1 to R3. In association with the speed change elements of the planetary gear sets, are arranged multiple-disc clutches C-1 and C-2, a band brake B-1, multiple-disc brakes B-2 to B-4 and one-way clutches F-1 and F-2. The individual clutches and brakes are each equipped with a hydraulic servo unit which is a piston/cylinder combination for applying/releasing the frictional engagement elements of the clutches and brakes, under the control of the servo oil pressure supplied by the hydraulic control units (not shown).

In this transmission, the torque output from an engine (not shown) is transmitted through the torque converter to the input shaft of the O/D unit. The rotation of the input shaft is output as the first speed rotation from the output shaft when the clutch C-0 is applied to connect the O/D unit directly and when the clutch C-1 of the main transmission mechanism is engaged, while leaving all the remaining brakes released (as shown in FIG. 11).

Second speed is achieved when the O/D unit is directly connected and when the clutch C-1 and the brake B-3 of the main transmission mechanism are applied. At this time, the input to the ring gear R2 of the planetary gear unit of the main transmission mechanism is output by using the carrier C1 as a reaction element for the carrier C2 and by directly connecting the elements R1 and C3 to the carrier C2.

Third speed is also achieved when the O/D unit is directly connected and when the clutch C-1 and the brake B-2 are applied while leaving the remaining elements released (as shown in FIG. 11). At this time, the input to the ring gear R2 is output using the sun gear S2 as a reaction element for the carrier C2 and connecting the carrier C3 to the former.

Fourth speed is also achieved when the O/D unit is directly connected and when both the clutch C-1 and the clutch C-2 are applied. At this time, the input is fed to the ring gear R2 and the sun gear S2 so that the planetary gear unit of the main transmission mechanism is directly connected to output the input as is.

Fifth speed is achieved, when the main transmission mechanism is in the aforementioned fourth speed, by releasing the clutch C-0 and applying the brake B-0 to fix the sun gear S0 and accelerate the O/D unit.

Reverse is achieved by accelerating the O/D unit, as above, and by applying the clutch C-2 and the brake B-4 of the main transmission mechanism. At this time, the input to the sun gear S2 is output as reverse rotation of the carriers C2 and C3, using the ring gear R3 as the reaction element.

The automatic transmission described above is adopted to the present invention by installation of a torque detector TD between the torque converter TC and the O/D unit, as shown in FIG. 10.

In the above-described gear train the speed change between the fourth speed and the fifth speed, for example, is a so-called "clutch-to-clutch" shift, which does not involve operation of any one-way clutch and is achieved by applying the brake B-0 while releasing the clutch C-0. FIG. 12 is a diagram plotting the changes in the oil pressure at this time; FIG. 13 is a diagram of change in the input RPM of the transmission at this time; and FIG. 14 is a diagram plotting change in the output torque of the transmission versus time in such a shift.

As the input torque to the transmission increases, the oil pressure, indicated at C in FIG. 12, where application of the brake (B-0) starts, the oil pressure indicated at B in FIG. 12, where the application of the brake (B-0) is completed, and the oil pressure at point A in FIG. 12, where release of the clutch (C-0) starts, are all raised. When the input torque to the transmission decreases, on the other hand, the oil pressures at points A, B and C drop.

By arranging the torque detecting device adjacent the input shaft of the transmission, the input torque to the transmission can be simply monitored. Moreover, when the gear ratio is detected in terms of the input RPM and the output RPM of the transmission, the torque detection sensor can be used in combination with the tactometer for detecting the input RPM to the transmission.

In the aforementioned clutch-to-clutch shift, wherein the apply side pressure is controlled according to the characteristics of an accumulator while the release side pressure is controlled by a linear solenoid, in the prior art, the result of detection is fed back for subsequent control of the linear solenoid. However, a change in the output torque of the transmission will not lead to a change in the input RPM of the transmission. In other words, the change in the output torque of the transmission begins to appear after the period of the ineffective portion of the stroke of the piston in the servo for brake B-0 (as seen between D and E in FIG. 14) and engagement is started before the change in the input RPM of the transmission starts. At this time, no change occurs in the input RPM of the transmission (as shown in FIG. 14) so that the applied brake (B-0) and the released clutch (C-0) are tied up. As a result, an abrupt drop in the torque, if any, as indicated by single-dotted lines in FIG. 14, cannot be detected and, accordingly, the clutch pressure cannot be controlled according to the torque change.

In order to detect such an abrupt torque change, the torque detecting device may be attached to the output shaft of the transmission. However, for such an application, the torque detecting device of the prior art must be equipped with a special accessory, which is high in cost and complicated in structure. By adopting the torque detecting device of the second embodiment of the present invention, as shown in FIG. 15, the torque change during the clutch-to-clutch speed change can be detected at a low cost without substantial change to the construction of the transmission, and the clutch pressure can be controlled on the basis of the torque to provide an automatic transmission having an extremely low shift shock at a low cost. When the gear ratio is to be determined by detection of the input RPM and the output RPM of the transmission, the torque detection sensor of the second embodiment of the present invention can be used in combination with a tachometer to detect the output RPM to the transmission.

The torque detecting device may be mounted directly adjacent a transmission element involved in effecting the clutch-to-clutch speed change, as shown in FIG. 16. By mounting the torque detecting device directly adjacent a rotary element involved in the clutch-to-clutch speed change, as shown in FIG. 16, the torque change can be detected with a higher responsiveness as compared with detection of torque change at the output shaft of the transmission. Thus, when the torque detecting device of the third embodiment is mounted at the position of FIG. 16, there is no time lag in detecting the torque change so that the control can be effected with greater accuracy.

On the other hand, when the torque detecting device of the present invention is arranged (although not shown) between is the torque converter TC having the lockup clutch L/C and the engine, the input torque to the torque converter (or the output torque of the engine) can be detected in a manner offering advantages similar to those of the previously described embodiment and control of applying/releasing the lockup clutch can be effected according to the torque converter input torque by using that detected input torque.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A torque detector comprising:

a first rotary member connected to an input shaft and having a first set of elements spaced apart around its circumference;

a second rotary member connected to an output shaft and arranged coaxially with said first rotary member, said second rotary element having a second set of elements spaced apart around its circumference, the elements in said second set being equal in number to the elements in said first set, wherein the circumferential length of said spaced elements is equal to the circumferential length of spaces between said spaced elements;

an elastic member sandwiched between said first rotary member and said second rotary member for deforming according to a torque acting thereon;

sensor means, confronting said first and second rotary members, for detecting the rotational phase of each of said rotary members; and torque computing means for computing the torque acting on said elastic member, by determining the rotational phase difference between said first and second rotary members.

2. A torque detecting device according to claim 1, wherein said sensor means includes a tachometer confronting said first and second sets of spaced elements.

3. A torque detecting device according to claim 2, wherein said sensor means generates a pulse signal for each of said first and second rotary members and wherein said torque computing means computes the torque by determining the overlaps of the pulse signals.

4. A torque detecting device according to claim 2, wherein said sensor means generates a pulse signal for each of said first and second rotary members and wherein said torque computing means computes the torque by determining areas of non-overlap in the pulse signals.

5. A torque detector according to claim 1 wherein said sensor means comprises two sensing elements, one of said sensing elements confronting said first rotary member and the other of said sensing elements confronting said second rotary member.

6. A torque detector according to claim 1 wherein said first and second sets of spaced elements are defined as comb-teeth extending axially and depending from bottom plates which extend radially from said input shaft and said output shaft, respectively.

* * * * *

UNITED STATES PATENT AND TRADEMARK OFFICE
CERTIFICATE OF CORRECTION

PATENT NO. : 5,767,420
DATED : June 16, 1998
INVENTOR(S) : de SCHEPPER et al

It is certified that error appears in the above-indentified patent and that said Letters Patent is hereby corrected as shown below:

Title page,

Under "[56] References Cited", please add the following:

--U.S. 4,767,925    8/88  Kawamoto et al...... 250/231

Foreign Patent Documents
    62-157541 7/13/97    Japan
    62-157523 7/13/87    Japan--.

Signed and Sealed this

Eighteenth Day of May, 1999

Attest:

Q. TODD DICKINSON

*Attesting Officer*　　　Acting Commissioner of Patents and Trademarks